Aug. 2, 1932. J. JACKSON 1,870,121
TREATMENT OF VEGETABLE REFUSE FOR OBTAINING USEFUL PRODUCTS THEREFROM
Filed Feb. 23, 1928 3 Sheets-Sheet 1

Inventor:
James Jackson
By James L. Norris
Attorney

Aug. 2, 1932.  J. JACKSON  1,870,121
TREATMENT OF VEGETABLE REFUSE FOR OBTAINING USEFUL PRODUCTS THEREFROM
Filed Feb. 23. 1928   3 Sheets-Sheet 3

Inventor
James Jackson
By
Attorney.

Patented Aug. 2, 1932

1,870,121

UNITED STATES PATENT OFFICE

JAMES JACKSON, OF BIRMINGHAM, ENGLAND, ASSIGNOR TO INDUSTRIAL WASTE ELIMINATORS LIMITED, OF LONDON, ENGLAND

TREATMENT OF VEGETABLE REFUSE FOR OBTAINING USEFUL PRODUCTS THEREFROM

Application filed February 23, 1928, Serial No. 256,409, and in Great Britain March 2, 1927.

This invention relates to the treatment of vegetable refuse for obtaining useful products therefrom, and in order that the invention may be the better understood it is remarked that the disposal of large quantities of vegetable refuse in an economic manner has long been a problem presenting considerable difficulties and no satisfactory and really economical solution has so far been attained.

It has, for example, been proposed to utilize such refuse for the feeding of hogs but this practice has limitations.

Incineration of the refuse has been attempted but it has no calorific value and contains too much moisture to render incineration economical in practice.

A further method which has been proposed is to pulverize the refuse and mix it with fine ashes to form a low grade fertilizer.

This practice is open to the objection that owing to the low grade of the resulting material its commercial value is small while its bulk renders the cost of transport for any considerable distance prohibitive and consequently the outlets for such material are limited.

The present invention resides in a process, and means for carrying the same into effect, for the treatment of vegetable refuse, which term it is to be understood also includes fruit refuse, whereby there is obtained therefrom a dry or practically dry pulp which can be readily broken up, crushed or ground and which by itself or admixed with other ingredient or ingredients provides a high grade artificial manure or a food for animals, poultry or the like, the process further yielding expressed liquid or juices which may be submitted to processes for the recovery of alcohol or other commercially valuable content.

According to the present invention the vegetable refuse is submitted to the ordinary or other pulverizing or beating process and together with the extraneous matter which is generally present with such refuse is delivered into a tank containing water the said tank having therein any convenient means for stirring or agitating the contents.

The pulverized vegetable matter or "stock" which rises to the surface of this tank is allowed to float or is mechanically delivered therefrom on to a dehydrating device, as for example, a rotating and preferably vibrating cylinder the periphery of which is of fine mesh or other permeable material, the mixture of vegetable matter and water travelling over the upper section of the cylinder and the major part of the water being drained off on this section of the machine.

The partially dried or drained material is delivered from the dehydrating device on to an endless travelling belt or band of felt, or other preferably absorbent material, by which it is carried between a pair, or pairs, of rolls, the pressure to which the material is thus subjected serving very effectually to express the remaining liquid and juices therefrom and completely pulp the vegetable material. The dehydrated pulp is removed from the travelling conveyor by a scraper or other convenient means and delivered on to a second travelling band or conveyor or into a truck or other suitable receptacle whereby it is conveyed to mechanism or plant serving to effect any further drying which may be desirable and the crushing and screening or other operations to be performed thereon.

The invention will be further described with reference to the accompanying drawings, wherein is illustrated a convenient embodiment of machinery or apparatus for carrying the aforesaid process into effect.

Figure 1:
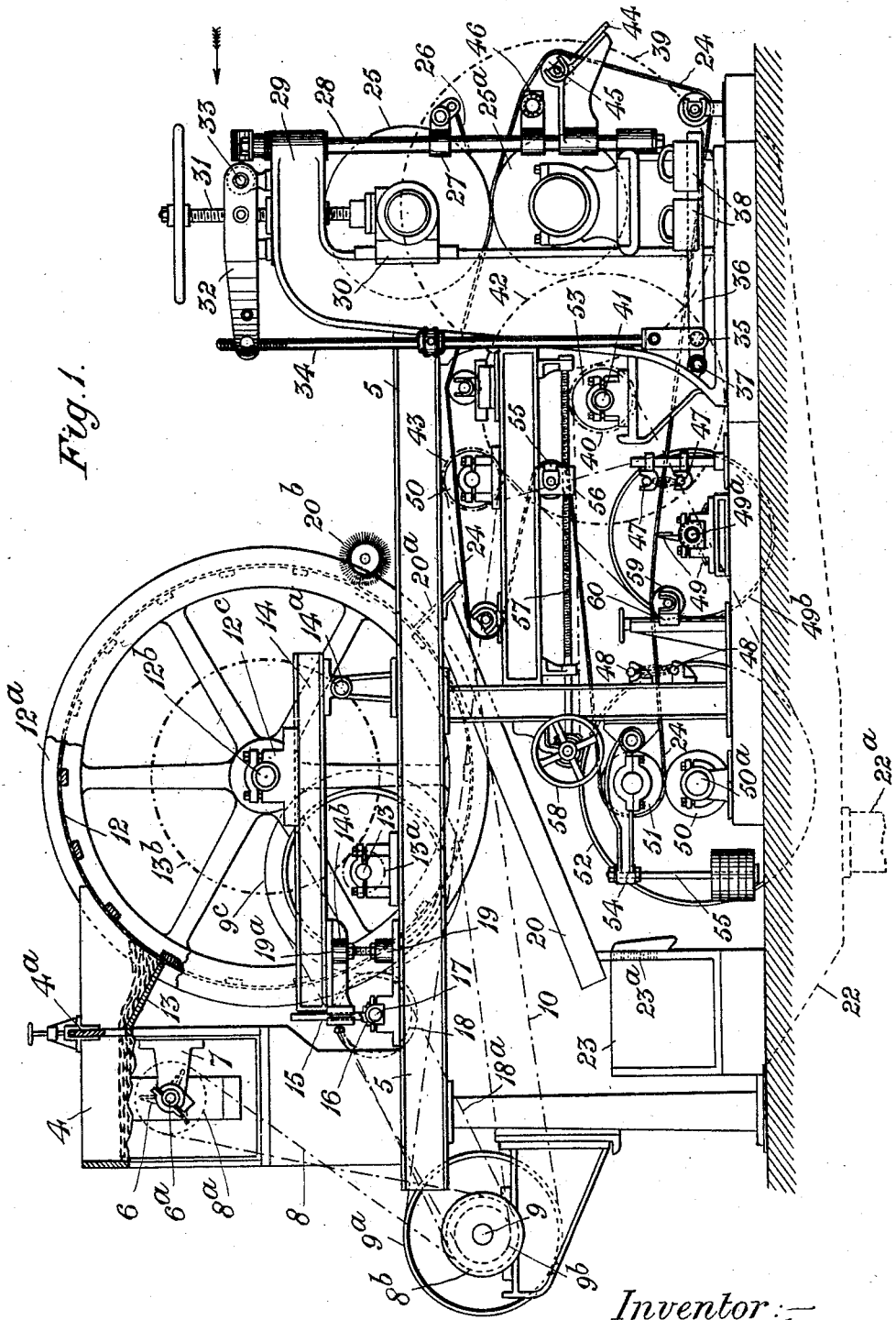
Figure 1 is a side elevation of the machine.
Figure 2:
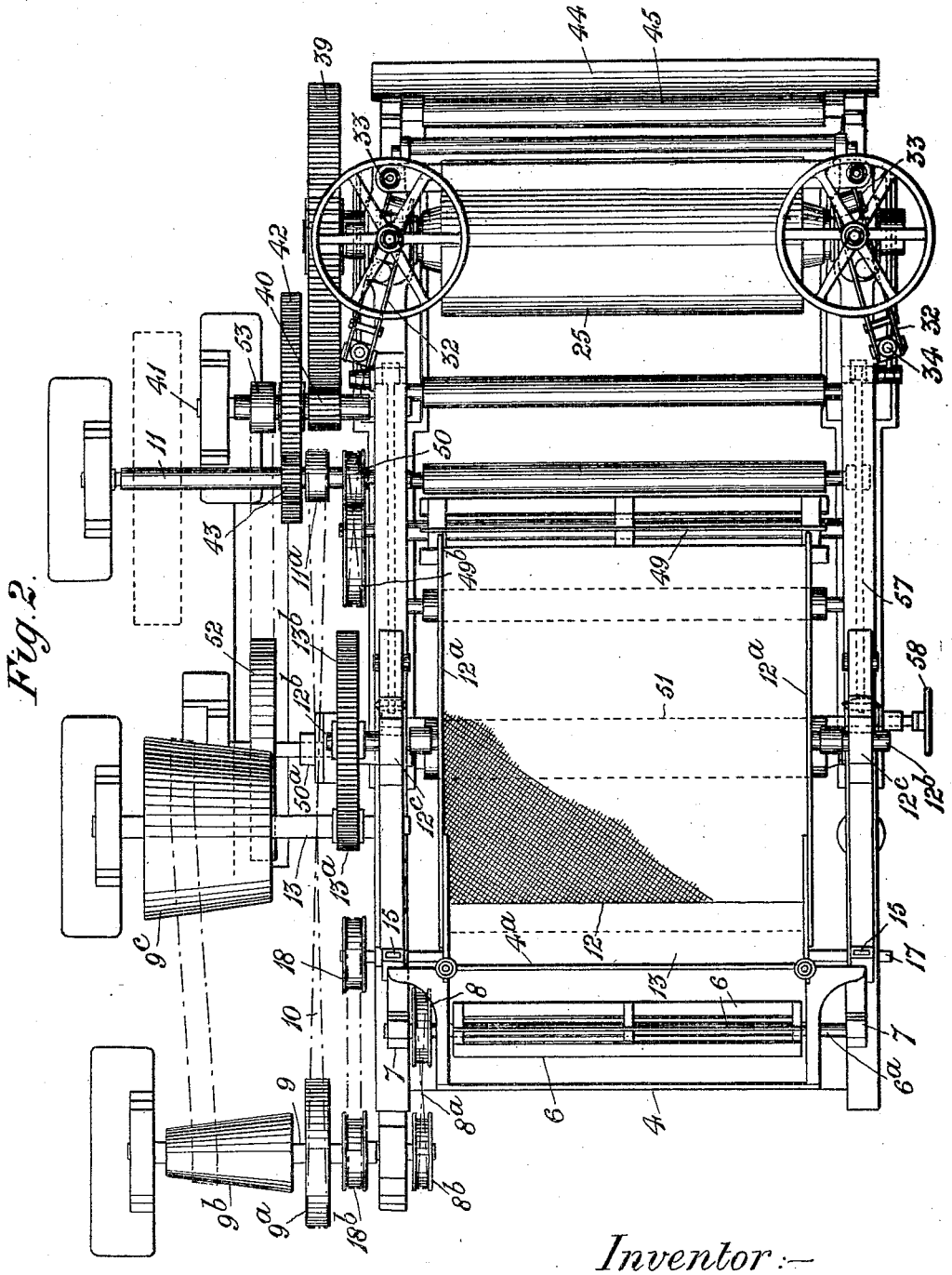
Figure 2 is a plan of the same.

In the said Figures 1 and 2 the driving belts whereby motion is communicated to certain of the shafts or spindles are indicated in dotted lines only for the sake of avoiding confusion and the driving pulley or other gear wheel on the main shaft which wheel may vary in diameter according to the desired speed of rotation is also indicated in dotted lines only.

The same numerals of reference indicate the same parts in the several figures of the drawings.

In accordance with the invention the pulverized vegetable matter or "stock" is delivered from a chute or conveyor, not shown, to a water containing tank or receptacle 4 which extends transversely across the front end of the machine and may be supported on the longitudinal side members 5 of the framing of the machine which framing is designed to give ready access to all working parts.

The said receptacle or tank 4 is provided with suitable means for agitating its contents, as for example, a plurality of vanes 6 on a revolving spindle $6^a$ mounted in bearings 7 provided on the outerside of the body of the tank, the said spindle being conveniently driven by the pulley 8 and belt $8^a$ from the pulley $8^b$ on the shaft 9, which shaft is driven by the pulley $9^a$ and belting 10 which connects same with the pulley $11^a$ on the main driven shaft 11 of the machine.

All heavy and extraneous substances subside in the said receptacle 4 and may be periodically washed out or otherwise removed therefrom through a gate or valve controlled outlet giving access to a drain, not shown. The vegetable material rises to the surface of the fluid in the receptacle and floats therefrom through an adjustable gate or sluice $4^a$ on to the upper section of an adjoining revolving drum 12 the material being conducted to the said drum over a chute or guide board 13 which may join the drum by a piece of rubber or other sheeting; or other suitable guide adapted for adjustment may be provided to conduct the material flowing through the gate or sluice to the periphery of the drum 12, and if desired the receptacle 4 may be provided with mechanism adapted to feed the stock through the outlet therefrom.

Figure 3:
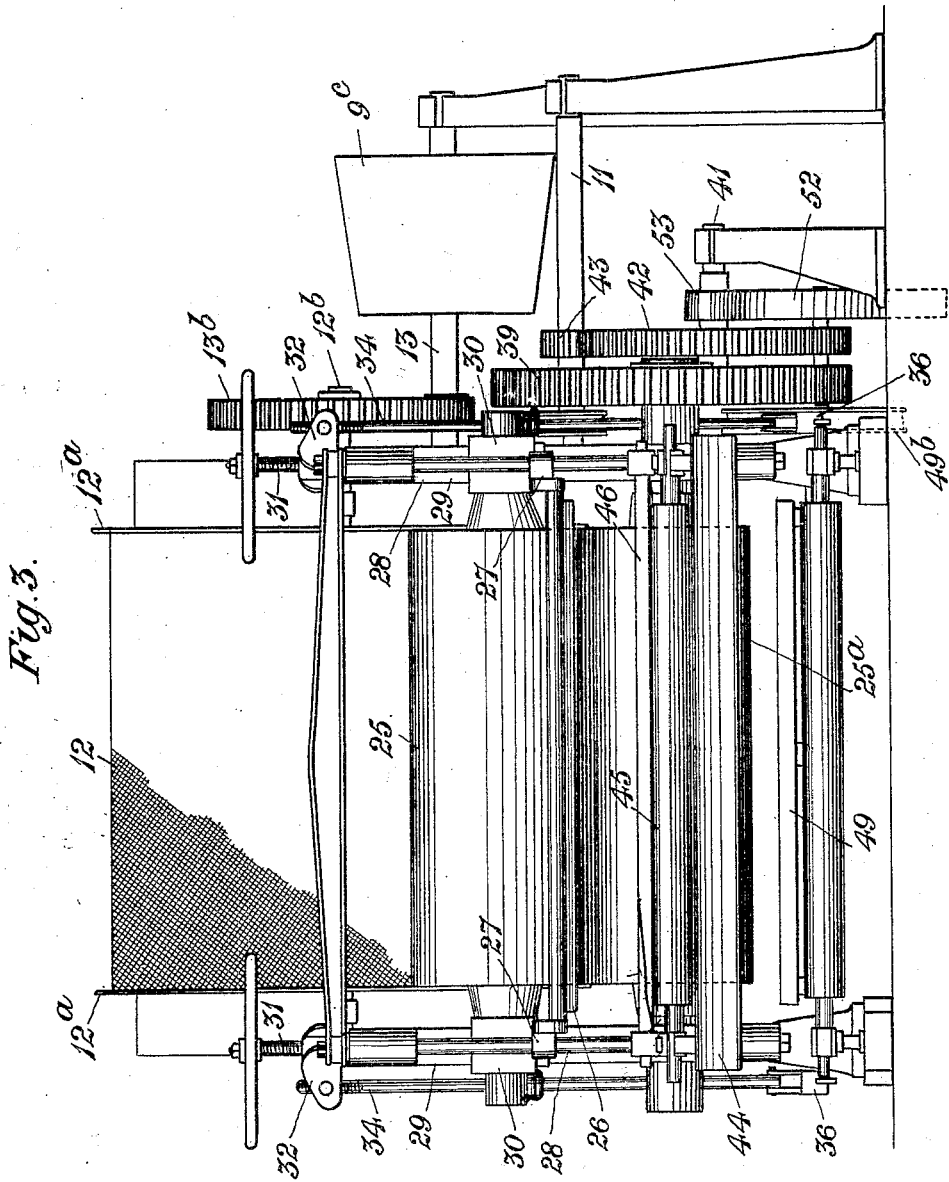
Figure 3 is an elevation looking in the direction of the arrow in Figure 1, the travelling conveyor hereinbefore referred to being omitted in the said Figure 3 and also in Figure 2.

The periphery of the revolving drum 12 is of wire gauze or like perforated material which is indicated by cross hatching on a portion only of the drum in Figures 2 and 3 of the drawings and the ends of the drum are provided with flanges $12^a$ to prevent flow of the stock over the said ends, or the periphery of the drum may be of coarse linen or other permeable material.

The bearings $12^c$ of the drum spindle $12^b$ are preferably mounted on a pair of lever arms or pivoted members 14, pivoted at $14^a$, means being provided to give a jogging motion to the said members so as thereby to communicate a rapid vibratory motion to the drum and thus very effectually to shake the water from the stock in its passage thereover.

Suitable means for effecting this vibratory motion consist in the provision in combination with the free end of each of the members 14 of a bar 15 the lower end of which is adapted to engage with ratchet wheels 16, one only of which is seen in Figure 1, mounted on a spindle 17 driven by a pulley 18 and belt $18^a$ from the pulley $18^b$ on the shaft 9 hereinbefore referred to.

The rise and fall of the lever-like members 14 may be regulated by the provision below the arms of a screwed rod 19 the upper end of which enters a socket $14^b$ on a part carried by the arm, a screw nut $19^a$ on the rod 19 forming a stop by the adjustment of which the rise and fall are regulated.

The drum 12 may conveniently be driven from the shaft 9 by a belt connection of the cone pulley $9^b$ on said shaft 9 with a cone pulley $9^c$ on the shaft 13, a pinion $13^a$ on the shaft 13 meshing with the toothed wheel $13^b$ on the spindle $12^b$ of the drum.

The drum is located over a trough or receptacle 20 into which the extracted water descends through the interior of the drum. The said trough 20 is provided at the end remote from the feed end of the apparatus with a plate $20^a$ preferably perforated and conveniently adapted to constitute a "doctor" or scraper which serves to remove from the drum any part of the partially dehydrated material which has not already dropped therefrom by gravity.

The liquid and any material which has been carried therewith into the trough 20 may be delivered therefrom directly to the sump 22 from which it can be drawn through a conduit $22^a$ and pumped to any desired location, but preferably the trough 20 delivers the liquid to a receptacle or tank 23 which is perforated at one side as indicated by the dotted lines $23^a$ from which tank the liquid overflows through the said perforations into the sump 22, any solid matter which floats or settles to the bottom of the tank being removed from time to time and returned to the receptacle 4 hereinbefore referred to as the entrance or feed end of the apparatus.

The partially dehydrated vegetable material after passing over the upper section of the drum 12 falls or is scraped therefrom by the plate $20^a$ on to a continuously travelling belt or band 24 of felt or other suitable and preferably filter-like or absorbent material.

If desired a brush, shown only in Figure 1 and marked $20^b$, may be arranged transversely across the machine and adjacent the periphery of the drum 12 the said brush being adapted for rotation and serving to remove or assisting the plate $20^a$ in removing the "stock" from the periphery of the drum.

It will be appreciated that the revolving dehydrating drum device described may be replaced by a sloping flat or curved vibrating platform having a permeable surface.

The travelling belt and the material or stock thereon passes between the nip of a pair (or pairs) of rolls 25, 25ª, either or both of which may be heated either internally or externally, and the pressure of which serves to crush the material and express the remaining water together with juices from the crushed cells of the stock therefrom, the material or stock passing from between the rolls in a more or less dry and completely pulped condition.

The upper roller 25 of the pair of rolls 25, 25ª may be of larger diameter than the lower roll and the said upper roll preferably has combined therewith a scraper device 26 conveniently carried by arms or brackets 27 located on the vertical rods 28, mounted on the end standards 29 of the framing.

Means are or may be provided for adjusting the pressure exerted by the upper roll 25 (or rolls), the said roll, for example, being mounted in bearings 30 adapted to slide on the standards 29 and adjustable by motion of the screws 31 in screw boxes in the standards; or the said screws 31 may work in screw boxes in lever-like members 32 fulcrumed at 33 to the head of the standards 29 and connected at their other ends by a link rod 34 pivotally connected at 35 to a lever member 36 fulcrumed on the frame at 37, said lever member being adapted to receive weights such as 38, the weighted compound lever system thus provided enabling any desired pressure of the top roll to be readily applied.

The upper roll 25 may be rotated by friction with the felt or it may be positively geared to rotate with the lower roll 25ª.

A suitable gearing for effecting the rotation of the lower roll 25ª comprises a toothed wheel 39 mounted on the spindle or trunnion of the said roll and meshing with a driving pinion 40 on a countershaft 41 said countershaft being driven through the toothed wheel 42 thereon in mesh with a pinion 43 on the main shaft 11.

The pulped material is removed from the travelling band after passing through the pressure rolls by the action of a "doctor" or scraper which may be constituted by the upper edge of an inclined board or plate 44 extending transversely across the machine adjacent a guide roller 45 and down which board the material descends into trucks or on to a travelling platform or conveyor, not shown, whereby it is removed from the machine.

Or a rapidly rotating batter arranged below the travelling band and adapted to beat against the same may be substituted for the doctor 44.

Where the material is delivered on to a second travelling band or conveyor it may be carried thereby to a second pair of rolls which may be heated.

There may be arranged adjacent the periphery of the lower roll and extending transversely across the same an angular bar 46 in passing over which the endless band takes a bend the bending action serving in a measure to loosen the adhesion of the pulp from the band and thus facilitating the removal of the material when the same comes under the action of the "doctor" or scraper 44.

Provision may be made for applying a current of hot air or steam to the "stock" while on the conveyor before or after it passes through the rolls 25, 25ª or through the secondary rolls, where such are provided, for the purpose of aiding the drying operation or for parching the protein matter in the stock or for other purpose such as facilitating the stripping of the material from the apron or conveyor.

The section of the continuously travelling felt or like band 24 from which the pulped material or stock has been scraped is then brought under the action of means whereby it is thoroughly washed, as for example, a plurality of pairs of perforated tubes 47 and 48 arranged transversely above and below the path travelled by the belt after it passes the doctor or scraper device, water under pressure being passed into the said tubes 47 and 48 and issuing in jets therefrom, the jets being directed against the upper and lower faces respectively of the band.

To facilitate and render more efficient the washing or cleaning of the travelling band a rotating beater or "batter" 49 may be provided to operate thereon at a part or parts intermediate the spray delivery tubes 47 and 48, said batter being mounted on a shaft or spindle 49ª which is driven by a belt connection of the pulley 49ᵇ thereon with a pulley 50 on the main shaft 11.

After washing the travelling belt or band passes through a pair of rolls 50, 51 one or both of which may be rubber covered, said rolls serving to remove water and dirt therefrom so that the belt returns cleaned and practically dry to receive the fresh layer of stock from the drum 12.

The lower roller 50 may be driven in timed relationship to the speed of the belt through the nip of the rolls 25, 25ª by a belt connection of the pulley 52 on the spindle 50ª of the said lower roll with a pulley 53 on the countershaft 41 hereinbefore referred to.

Preferably the bearings of the upper roller 51 are carried by lever-like arms or brackets 54 the free ends of which are provided with a depending rod 55 adapted to receive weights whereby any desired pressure of these rolls on the band can be provided for.

The continuous belt or band is supported and guided in the path in which it travels by suitably located rollers or pulleys in addition to those already mentioned and one or more of the said rollers or pulleys is preferably so arranged and made capable of adjustment for taking up any initial slackness or slackness which may develop in the belt or band in use.

For example, the guide pulley shown at 55 may be mounted at each side of the machine in bearings 56 adapted to be traversed horizontally by the longitudinally arranged traversing screws 57 the front ends of which are provided with bevel wheels gearing with corresponding bevel wheels on a transverse shaft operable by the hand wheel 58, and further in order to adjust the belt in the region of the beater 49 so as to regulate the action of the said beater thereon there is or may be provided a transversely arranged supporting roller 59 carried by vertically adjustable bearings 60.

The machine or apparatus described may be driven by an electro-motor or it may be pulley driven from a main driving shaft or otherwise power driven.

The pulped material obtained by the process described is completely dried in any suitable drying apparatus and is crushed or ground and packed for transit or storage, the said material providing a fertilizer or artificial manure which may be used by itself or mixed in any desired proportion with other material, or the said material may, if suitable, be used as a food for animals or poultry and the like.

The liquid obtained from the stock during its passage through the machine and which collects in the sump 22 hereinbefore referred to may be pumped therefrom or passed directly into distillation apparatus for the recovery of alcohol, which is found to be present in the said liquid, therefrom, providing the alcohol content is of a sufficiently high percentage by volume to render its recovery economical, and it may also be treated for the recovery of other commercially valuable content.

Provision may be made for collecting the liquid and juices expressed by the action of the rolls separately from that descending from the dehydrating section of the machine so as to avoid dilution of the expressed liquid and juices the expressed liquid only being submitted to distillation or other process for recovery of any commercially valuable content.

It is to be understood that there is no limitation to the precise construction and arrangement or combination of the parts of the machine or apparatus described as the same may be varied within considerable limits without departing from the invention, for example, if thought necessary or desirable I may provide a roller or rollers with Archimedean vanes thereon and arranged transversely above the travelling belt or band 24 adjacent the dehydrating cylinder or drum to assist in efficiently spreading the material which passes off the drum on to the belt and further a suction box or boxes may be disposed at suitable points below the belt to assist in the removal of liquid from the belt and material thereon.

By the invention described a dry fertilizer in concentrated form and convenient bulk for transit or storage is expeditiously and economically obtained from vegetable refuse and which substance may, as already stated, be used as a food for animals or poultry, if desired.

What I claim is:—

1. In a vegetable refuse apparatus for partially dehydrating liquid from refuse prior to final separation in an expressing press, the combination comprising a base, a tank supported by said base and adapted to contain a liquid into which the previously disintegrated refuse is passed for the purpose of effecting the separation of the lighter vegetable constituents of the refuse from the undesirable heavier portions by reason of the lighter constituents floating to the surface of the liquid in the tank, a movable dehydrating means supported by said base and disposed adjacent to the tank, means for transferring the floating lighter refuse to the said dehydrating means, and means for conveying the refuse from the dehydrating means to an expressing press.

2. In a vegetable refuse apparatus for partially dehydrating liquid from refuse prior to final separation in a pressure means, the combination comprising a base, a tank supported by said base and adapted to contain a liquid into which previously disintegrated refuse is passed for the purpose of separating the lighter vegetable constituents from the undesirable heavier portions by a floating process, an agitator rotatably mounted within said tank, a movable primary dehydrator means supported by said base and disposed adjacent to the tank, means for transferring the floating refuse from the surface of the liquid in the tank to the dehydrating means, and means for conveying the treated refuse from the dehydrating means to pressure means, the conveying means effecting further dehydration of the material received from the primary dehydrating means.

3. In a vegetable refuse apparatus for partially dehydrating liquid from refuse prior to final separation in a pressure means, the combination comprising a base, a tank supported by the base and adapted to contain a liquid into which previously disintegrated refuse is passed for the purpose of separating lighter vegetable constituents from undesirable heavier portions by a floating process, a non-absorbent rotatably mounted primary dehydrating means disposed adjacent to the tank, a gate formed in one side of the tank and disposed at a height so that the floating material and liquid above the lower level of the gate may pass from the tank onto the rotatable dehydrating means, and an absorbent conveying means supported by the base for transferring material from the primary dehydrating means to pressure means.

4. Apparatus for the treatment of vegetable refuse comprising a base, a tank supported by the base and disposed at one end thereof, said tank adapted to contain a liquid into which disintegrated refuse is passed and serving to separate the lighter vegetable constituents from the heavier undesired constituents by floatation, means adjacent the tank for removing the floating constituents therefrom, a movable non-absorbent means also disposed adjacent to the tank and adapted to receive the floated material and to effect a partial dehydration thereof, a pair of pressure rolls supported by the base at the end opposite the tank, a longitudinally movable absorbent conveying means supported by the base to receive the partially dehydrated material from the non-absorbent dehydrating means, said absorbent means effecting further dehydration of the material, and conveying the material to the pressure rolls for completion of pulping and further dehydration.

5. Apparatus for treatment of vegetable refuse including a base, a flotation tank mounted thereon, means adjacent to the tank for removing lighter constituents therefrom, movable non-absorbent means mounted on the base and adapted to effect partial dehydration of the lighter constituents, pressure rolls mounted on the base, a longitudinally movable endless band conveyor covered with an absorbent material mounted between the movable non-absorbent means and the pressure rolls and adapted to receive the partially dehydrated material from the non-absorbent movable member and to effect further dehydration of the material, the band conveyor passing between the pressure rolls and conveying the material therethrough whereby the material is completely pulverized and further dehydrated, means mounted on the base for effecting the cleansing of the band conveyor subsequent to the delivery of the pulverized and dehydrated material, and means associated with the base for collecting the liquid extracted from the material.

6. Apparatus for treatment of vegetable refuse, including a base, a flotation tank supported on the base, a rotary non-absorbent member supported on the base adjacent to the tank and adapted to receive floated material from the tank and partially dehydrate the same, an endless band conveyor supported on the base adjacent the rotary non-absorbent member and adapted to receive partially dehydrated material from the same, a pair of pressure rolls supported on the base and thru which the upper length of the conveyor passes, said pressure rolls completing the pulverization and further dehydrating the material passing therethrough, means mounted on the base adjacent the pressure rolls for washing the absorbent material and the band conveyor during the passage thru the lower portion of its path, and means associated with the base for collecting the liquid extracted and expressed from the material.

7. Apparatus for vegetable refuse treatment comprising in combination a base having a flotation tank mounted thereon, means adjacent thereto for removing floating constituents, a rotatable member mounted on the base and adapted to receive the floated constituents on its periphery, an endless band conveyor having an absorbent surface and mounted on the base adjacent to the rotatable member, a pair of pressure rolls mounted on the base and having the upper portion of the conveyor band passing therebetween, means supported on the base for washing the absorbent material subsequent to its passage thru the pressure rolls, means for maintaining the tension of the conveyor, and means associated with the pressure rolls for adjusting the degree of pressure of the same.

In testimony whereof I have hereunto set my hand.

JAMES JACKSON.